United States Patent
Tait et al.

(10) Patent No.: US 9,417,835 B2
(45) Date of Patent: Aug. 16, 2016

(54) MULTIPLAYER GAME FOR DISPLAY ACROSS MULTIPLE DEVICES

(71) Applicant: Google Inc., Mountain View, CA (US)

(72) Inventors: Iain Tait, Brooklyn, NY (US); Stewart Smith, Brooklyn, NY (US); Jeffrey Paul Baxter, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 446 days.

(21) Appl. No.: 13/892,213

(22) Filed: May 10, 2013

(65) Prior Publication Data

US 2015/0212786 A1    Jul. 30, 2015

(51) Int. Cl.
*G09G 5/00*    (2006.01)
*G06F 3/14*    (2006.01)

(52) U.S. Cl.
CPC .......... *G06F 3/1446* (2013.01); *G09G 2356/00* (2013.01); *G09G 2370/042* (2013.01)

(58) Field of Classification Search
CPC ................ G09G 5/14; G09G 2360/04; G09G 2300/026; G09G 2356/00; G06F 3/147; A63F 13/35; A63F 13/79; A63F 13/577; A63F 13/00082; A63F 9/14
See application file for complete search history.

(56) References Cited

U.S. PATENT DOCUMENTS

| | | | | |
|---|---|---|---|---|
| 6,271,806 B1 * | 8/2001 | Motoshima et al. | .......... | 345/418 |
| 6,527,637 B2 * | 3/2003 | Fujioka | .................. | A63F 13/00 463/30 |
| 6,767,282 B2 * | 7/2004 | Matsuyama | ....... | A63B 69/3614 463/3 |
| 6,921,336 B1 * | 7/2005 | Best | ....................... | A63F 13/10 463/32 |
| 7,445,549 B1 * | 11/2008 | Best | ....................... | A63F 13/10 463/30 |
| 8,690,675 B2 * | 4/2014 | Ito | ........................... | A63F 13/06 463/37 |
| 8,700,356 B2 * | 4/2014 | Lee et al. | ....................... | 702/151 |
| 8,961,307 B2 * | 2/2015 | Akifusa | .................. | A63F 13/04 463/30 |
| 9,161,076 B2 * | 10/2015 | Kawai | ................ | H04N 21/4125 |
| 2002/0165028 A1 * | 11/2002 | Miyamoto | .............. | A63F 13/06 463/46 |
| 2003/0071832 A1 * | 4/2003 | Branson | ....................... | 345/698 |
| 2005/0168399 A1 * | 8/2005 | Palmquist | ..................... | 345/1.1 |
| 2006/0033712 A1 * | 2/2006 | Baudisch et al. | ............. | 345/157 |

(Continued)

FOREIGN PATENT DOCUMENTS

EP    2 565 751 A1    3/2013

OTHER PUBLICATIONS

"Separating Musical Parts in the Mix," Feb. 20, 2013, http://midimagic.sgc-hosting.com/mixsepr.htm.*

*Primary Examiner* — Amare Mengistu
*Assistant Examiner* — Crystal A Mathews
(74) *Attorney, Agent, or Firm* — McDermott Will & Emery LLP

(57) ABSTRACT

A system and method for generating a virtual gamespace for display to multiple players via respective web browsers is disclosed. A virtual gamespace, including a two-dimensional landscape, is generated and divided according to a number of devices participating in a game. The divided portions are provided to the devices for display so that the landscape is viewable when each divided portion is displayed on a respective one of the devices and the devices are collectively viewed together. A server receives control information for a game token from a device, determines one of the divided portions of the 2-D landscape for display of the game token based on the control information, and transmits the control information to the device responsible for displaying the determined portion of the 2-D landscape, and the game token is rendered in connection with the determined portion according to the control information.

20 Claims, 5 Drawing Sheets

(56) References Cited

U.S. PATENT DOCUMENTS

| | | | |
|---|---|---|---|
| 2007/0087686 A1* | 4/2007 | Holm et al. | 455/3.06 |
| 2007/0229467 A1* | 10/2007 | Sakai et al. | 345/173 |
| 2008/0216125 A1* | 9/2008 | Li et al. | 725/62 |
| 2009/0160731 A1* | 6/2009 | Schuler et al. | 345/1.1 |
| 2009/0309808 A1* | 12/2009 | Swingler | 345/1.3 |
| 2010/0045667 A1* | 2/2010 | Kornmann et al. | 345/419 |
| 2010/0053164 A1* | 3/2010 | Imai et al. | 345/427 |
| 2010/0113148 A1* | 5/2010 | Haltovsky | A63F 13/12 463/30 |
| 2010/0144283 A1* | 6/2010 | Curcio et al. | 455/66.1 |
| 2010/0203933 A1* | 8/2010 | Eyzaguirre et al. | 463/2 |
| 2010/0313143 A1* | 12/2010 | Jung et al. | 715/753 |
| 2010/0315331 A1* | 12/2010 | Cheng et al. | 345/156 |
| 2011/0109526 A1* | 5/2011 | Bauza et al. | 345/1.3 |
| 2012/0032929 A1* | 2/2012 | Cho | 345/204 |
| 2012/0062442 A1* | 3/2012 | Locker et al. | 345/1.3 |
| 2012/0108340 A1* | 5/2012 | Ashida | A63F 13/02 463/39 |
| 2012/0220355 A1 | 8/2012 | Haltovsky et al. | |
| 2012/0242596 A1* | 9/2012 | Sip | 345/173 |
| 2012/0280898 A1* | 11/2012 | Lucero et al. | 345/156 |
| 2013/0083240 A1* | 4/2013 | Kerr et al. | 348/383 |
| 2013/0176255 A1* | 7/2013 | Kim et al. | 345/173 |
| 2013/0198334 A1* | 8/2013 | Ikenaga et al. | 709/217 |
| 2013/0241801 A1* | 9/2013 | Petrik et al. | 345/1.1 |
| 2013/0265487 A1* | 10/2013 | Yu et al. | 348/383 |
| 2013/0271491 A1* | 10/2013 | Anderson | 345/633 |
| 2013/0296057 A1* | 11/2013 | Gagner | G06F 3/017 463/37 |
| 2013/0300885 A1* | 11/2013 | Huang et al. | 348/211.2 |
| 2014/0009366 A1* | 1/2014 | Chang | 345/1.1 |
| 2014/0028726 A1* | 1/2014 | Dave et al. | 345/660 |
| 2014/0040765 A1* | 2/2014 | Fung | A63F 13/12 715/748 |
| 2014/0104139 A1* | 4/2014 | Buchner | 345/1.3 |
| 2014/0194066 A1* | 7/2014 | Li | 455/41.3 |
| 2014/0304335 A1* | 10/2014 | Fung et al. | 709/204 |
| 2014/0316543 A1* | 10/2014 | Sharma et al. | 700/94 |

* cited by examiner

MULTIPLAYER GAME FOR DISPLAY ACROSS MULTIPLE DEVICES

BACKGROUND

In two dimensional (2-D) virtual games, each player's device is provided a gamespace for rendering and display of a 2-D landscape. In some instances, the device may present only a portion of the 2-D landscape to a player, and reveal other portions to the player as the game progresses until the entire 2-D landscape is displayed on the device. Alternatively, virtual worlds allow multiple players to interact with each other in a three dimensional (3-D) gamespace. In this regard, each of the players see individualized perspective views of the gamespace, with each view rendered from a different perspective.

SUMMARY

The subject technology provides a system and method for generating a virtual gamespace based on display characteristics of multiple player devices. According to one aspect, a computer-implemented method may comprise generating a virtual gamespace for multiple devices based on display characteristics of the multiple devices, the virtual gamespace comprising a two-dimensional landscape, dividing the 2-D landscape between the multiple devices, the 2-D landscape being divided into portions based on the display characteristics, providing the divided portions to the multiple devices so that the 2-D landscape is viewable when each divided portion is displayed on a respective one of the multiple devices and the multiple devices are collectively viewed together, receiving control information for a player game token from a first of the multiple devices, selecting one of the divided portions of the 2-D landscape for display of the game token based on the control information, and instructing a second device responsible for displaying the determined portion of the 2-D landscape to render the game token in connection with the determined portion according to the control information. Other aspects include corresponding systems, apparatus, and computer program products for implementation of the computer implemented method.

The previously described aspects and other aspects may include one or more of the following features. For example, the 2-D landscape may comprise a virtual race track and the game token is a virtual car. Providing the divided portions to the multiple devices may comprise providing the divided portions to respective web browsers operating on the multiple devices, wherein the 2-D landscape is viewable when each respective web browser displays a corresponding divided portion of the 2-D landscape in a browser display area. In this regard, the display characteristics may comprise a display resolution or one or more physical dimensions of the browser display area of each respective web browser. Additionally or in the alternative, the display characteristics may comprise a display resolution of each of the multiple devices or a screen size of each of the multiple devices. The virtual gamespace may be reduced when a device is removed from the multiple devices, and increased when a device is added to the multiple devices.

The method may further comprise generating a soundscape comprising a plurality of musical instruments, associating each musical instrument with a respective one of the multiple devices, and providing, for each musical instrument, digital audio for the musical instrument to a device associated with the musical instrument for audio playback of the musical instrument by the device. The method may further comprise generating a soundscape comprising a plurality of musical instruments, associating each game token with a respective musical instrument, and providing, for each musical instrument, digital audio for the musical instrument to a device responsible for rendering a game token corresponding to the musical instrument for audio playback of the musical instrument by the device. The method may further comprise generating as soundscape comprising as sound effect for each game token, and providing each sound effect to a respective device responsible for rendering the game token far audio playback of the sound effect by the device. In this regard, a respective sound effect may be panned between the multiple devices with a movement of a corresponding game token.

In another aspect, a machine-readable medium may have, instructions stored thereon that, when executed, cause a machine to perform a method. Accordingly, the method may comprise generating a virtual gamespace for multiple devices based on display characteristics of the multiple devices, the virtual gamespace comprising a two-dimensional landscape, dividing the 2-D landscape between the multiple devices, the 2-D landscape being divided into portions each having one or more dimensions based on the display characteristics, providing the divided portions to the multiple devices so that the 2-D landscape is viewable when each divided portion is displayed on a respective one of the multiple devices and the multiple devices are collectively viewed together, receiving control information for a player game token from a first of the multiple devices, selecting one of the divided portions of the 2-D landscape for display of the game token based on the control information, and instructing a second device responsible for displaying the determined portion of the 2-D landscape to render the game token in connection with the determined portion according to the control information. Other aspects include corresponding systems, apparatus, and computer program products for implementation of the computer implemented method.

In a further aspect, a system may include one or more processors, and a memory. The memory may include server instructions thereon that, when executed, cause the one or more processors to receive one or more requests from multiple computing devices to participate in a virtual game, generate a virtual gamespace for the multiple computing devices based on display characteristics of web browsers for the multiple computing devices, the virtual gamespace comprising a two-dimensional landscape, divide the 2-D landscape between display areas for the web browsers, the 2-D landscape being divided into portions each being sized based on the display characteristics, provide the divided portions to the web browsers so that the 2-D landscape is viewable when each divided portion is displayed on a respective one of the multiple devices and the display areas for the web browsers are collectively viewed together, receive control information for a player game token from a first of the multiple computing devices, select one of the divided portions of the 2-D landscape for display of the game token based on the control information, and instruct a second computing device responsible for displaying the determined portion of the 2-D landscape to render the game token in connection with the determined portion according to the control information.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The subject technology provides a virtual gamespace that may be distributed to multiple devices for display to respective players via a web browser. The term "gamespace" is defined herein to include a mapped 2-D or 3-D space in which one or more objects may exist and move through, and interact with each other. The space is mapped such that an objects position may be located within the space, and any portion of the space may be rendered from one or more perspectives to generate a visual perspective of an interactive (virtual) world. In some aspects, the space may be topographically mapped, and an object may interact with terrain or move according to a topography corresponding to the object's position.

The entire gamespace is not rendered by each player device, but, rather divided between the devices, and each device is responsible for rendering and display of a divided portion of the gamespace. After a number of players and their devices have been identified as participants of as game, a server generates a virtual gamespace for the virtual game, including, a two-dimensional landscape. In at least one example, the landscape includes a race track on which players control virtual cars (e.g., slot cars) to compete in virtual racing events. The 2-D landscape is divided between the multiple devices, and a divided portion is provided by the server to each device. The landscape may be divided in any number of ways, including dividing the landscape into equal portions, or dividing based on the size or pixel density of each device's display screen.

Figure 1:
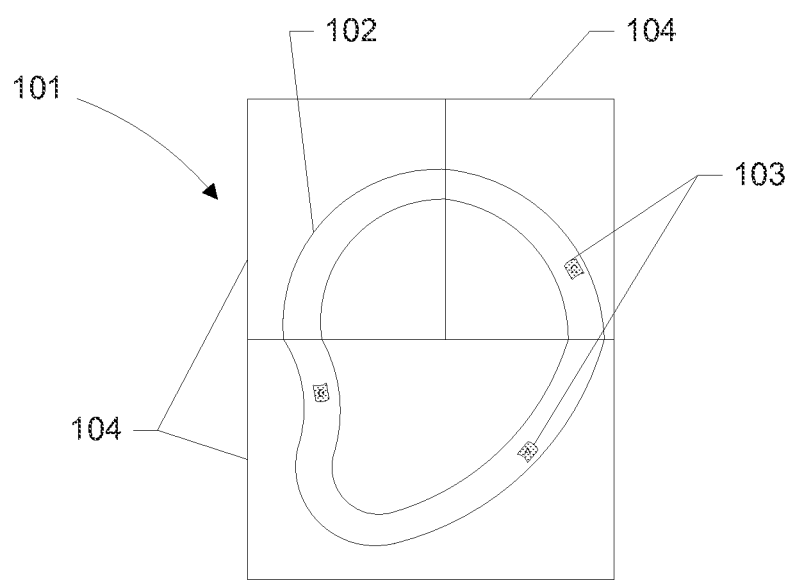
FIG. 1 depicts an example two-dimensional landscape for a virtual game that has been divided according to a number of computing devices participating in the game.

FIG. 1 depicts an example two-dimensional landscape for a virtual game that has been divided according to a number of computing devices participating in the game. As depicted in FIG. 1, a virtual gamespace provided by the subject technology may be implemented as a virtual automobile racing game. Accordingly, the gamespace may provide a 2-D landscape 101, including a race track 102 on which one or more virtual cars 103 may travel. In this example, 2-D landscape 101 (including race track 102) is divided into portions 104 according to the number of players participating in the game. In the depicted example, the landscape is divided into three portions 102, representing three different players or player devices.

As will be described in further detail, 2-D landscape 101 may not be divided equally. For example, landscape 101 may be divided based on one or more characteristics of the devices used by the players to play the game. In the depicted example, the size of each divided portion is proportional to a screen size of an associated device. Although divided, 2-D landscape 101 functions as if it were a single unit. As each player's race car moves around the track, they pass from one divided portion to another, and consequently from one a display screen of one device to a display screen of another device.

Figure 2:
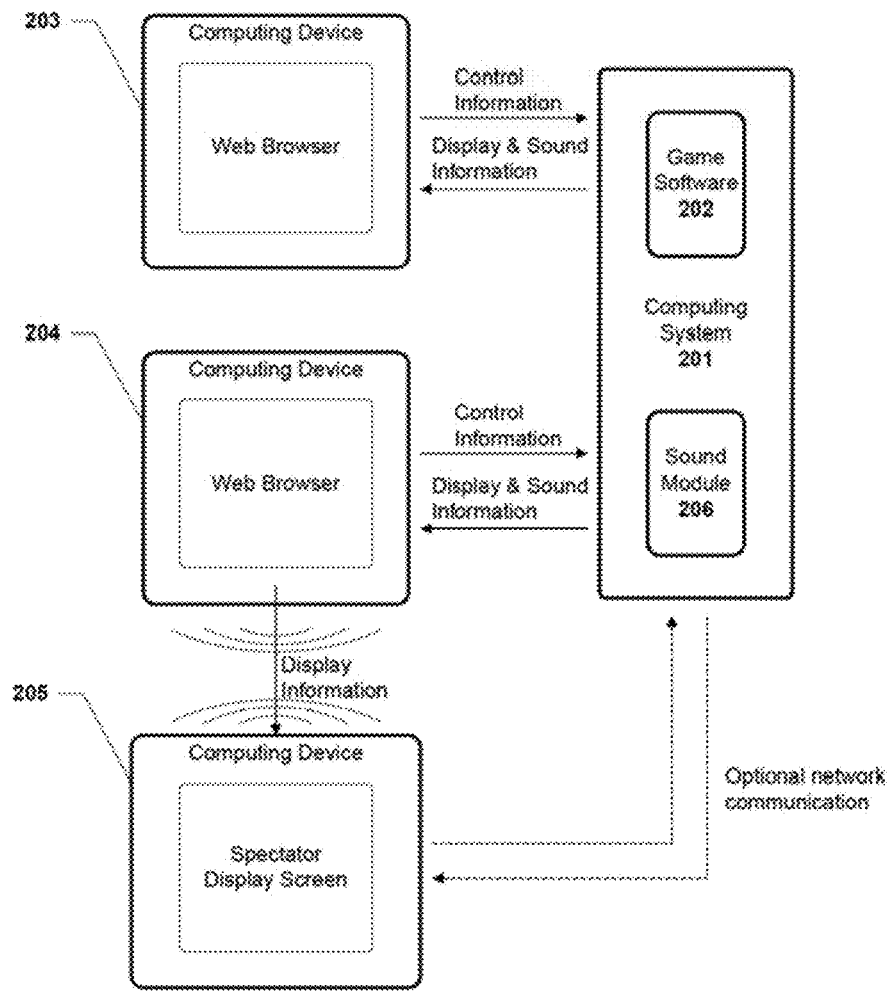
FIG. 2 depicts an example component diagram for generating a virtual gamespace based on display characteristics of multiple player devices.

FIG. 2 depicts an example component diagram for generating a virtual gamespace based on display characteristics of multiple player devices, according to some aspects of the subject technology. A central computer system 201 (e.g., a server) is responsible for gameplay, including gamespace organization and management, player authorization, and coordination and movement of player game tokens across the gamespace over a network, such as the Internet, WAN, or LAN. In this regard, computer system 201 may include game software 202 for generation of the virtual gamespace, calculation of player locations within the gamespace, generating consequence and result information based an player interactions within the gamespace, and for providing player location other game-related information to devices connected to computing system 201 over the network.

As depicted by FIG. 2, multiple player devices, including a first computing device 203 and a second computing device 204, may operably connect to computing system 201 and establish a client-server relationship. Player devices may include, for example, a tablet computer, smart phone, PDA, laptop computer, a television or other display device having a computer embedded within or attached thereto, or the like. Bi-directional, full duplex communication between the various player devices and computing system 201 may be accomplished using websockets or other similar network protocols in at least one implementation, first computing device 203 and second computing device 204 are configured to use websockets to communicate with computing system 201. To initiate a game, a player device transmits a request to join or create a gamespace to computing system 201. In this manner, the player of player device may have no knowledge of, or interaction with, computing system 201. The relationship between the devices is the same or similar to a cloud-computing model, such that gameplay occurs via the "cloud."

The virtual gamespace is created by computing system 201 on receiving an indication from one or more devices to create the gamespace. The size of the gamespace may depend upon how many devices have indicated participation in a current game. For example, the size or dimensions of a playable landscape for the gamespace may be based on display characteristics of the devices. The landscape automatically grows as each new device is added, and reduces when a device is removed. The landscape may grow or reduce in size based on the resolution or physical size of a display area of each device being added or removed. In one example, a landscape may include a race track having a first track length (e.g., measured in miles or kilometers) and a first number of turns (e.g., two) if two devices are participating, but expand to a second track length with a second number of turns (e.g., three or more) when one or more devices join in the game.

In the depicted example, computing system 201 receives an indication from first device 202 to create a game. At this point, the gamespace may or may not be generated until a second player has indicated a desire to join the game. On second player device 203 indicating a desire to participate in the game, and joining the game, the virtual gamespace is created, including a 2-D landscape for facilitation of gameplay between the players. In some aspects, the computing system 201 may not create the gamespace until instructed to do so by the first (or "host") player. Computing system 201 generates the gamespace, and the features of the gamespace, based on display characteristics of the devices. For example, the 2-D landscape may include a total playable display area corresponding to the collective display area of all devices participating in the game. The individual or total areas may be based on resolution or physical dimensions. Each device communicates its physical screen size and/or resolution to computing system 201 before the gamespace is created, and computing system 201 calculates the gamespace (including the corresponding 2-D landscape) based on the received information, and initiates the game.

After the gamespace is generated, computing system 20 divides the 2-D landscape for the gamespace between the multiple devices based on display characteristics of the participating devices. In this manner, a resolution or physical display area of each device may be used to divide the landscape. Each device is associated with a respective portion of the 2-D landscape. In some implementations, a portion associated with one device may be sized proportional to the collective parameters of other devices. For example, the portion of the 2-D landscape associated with the device may be determined by the size of the device's display area divided by the collective display area of all devices participating in the game (e.g., the total playable display area).

Computing system 201 provides the divided portions to the player devices by the transmission of display information to the devices. In this manner, the 2-D landscape is viewable when each divided portion is displayed on a respective one of the multiple devices and the multiple devices are collectively viewed together. Each device includes software or other machine-executable instructions that configures the device to communicate with computing system 201, including downloading the landscape for a virtual game, sending and receiving position or control information, local rendering and display of the landscape and other game-related features, and the like.

In various aspects, player devices 202 and 203 may each include it web browser configured for gameplay and display of the landscape and other game features, as well as for transmitting and receiving game information to and from computing system 201. The web browser may be configured by downloadable instructions from a website (e.g., hosted by computing system 201) or a browser component which may be downloaded and embedded within the web browser. Accordingly, the divided portions may be provided to respective web browsers operating on the multiple devices, such that the 2-D landscape is viewable when each respective web browser displays a corresponding divided portion of the landscape in a browser display area. The previously described display characteristics may include a display resolution or one or more physical dimensions of the browser display area of each respective web browser.

The 2-D landscape and portions thereof, player game tokens, and other objects within the virtual gamespace may be rendered within each web browser using for example, a scripting engine (e.g., JavaScript and paper.js) in connection with HTML5 (e.g., canvas elements) and/or vector graphics (e.g., scalable vector graphics). The web browser displays a portion of the 2-D landscape assigned to the device, and communicates with computing system 201 via websockets to transmit and receive control information for game tokens, and to receive display information for rending the portion or the landscape along with any game tokens in that portion of the landscape.

The web browser provides player controls for playing the game, including for moving a player's game token across the 2-D landscape. In this regard, the web browser may send, in response to manipulation of the controls, the control information for the player's game token to computing system 201. Control information may include, for example, a current or updated position, speed, and/or trajectory of the game token. Computing system 201 receives the control information and selects the portion of the 2-D landscape on which the game token should be displayed based on the control information. The control information, or a representation of the control information, is then provided by computing system 201 to the device responsible for displaying the determined portion of the 2-D landscape, and the game token is rendered by that device in connection with that portion of the landscape according to the control information.

With brief reference to FIG. 1, game software 202 may generate a mathematical model of track 102 based on points and Bézier curves for the boundaries of the track. Using this model the cars may simply follow the path of the track. Computing system 201 may determine position information, including an <x,y> position, direction, and speed vector, based on control information for a player's race car. The position information may be associated with and sent to a player device for rending of the race car. In some instances, network latency may delay transmission of position information. To accommodate network latency, each player device is configured with software to continuously render existing race can as moving along the track according to the mathematical model in a speed and direction calculated based on prior position information. When updated information is received from computing system 201, the player device may course correct with minimal repositioning of the player's race car.

Some implementations may include a spectator display 205 on which the entire 2-D landscape may be viewed by either the participants of a corresponding game, or by spectators. Computing system 201 is configured to broadcast the entire 2-D landscape and participating game tokens (e.g., race cars) to spectator display 205. Spectator display 205 may be, for example, a television or other display device operably connected to a participating device or a network (e.g., the Internet). Spectator display 205 is configured to receive gamespace information from the connected device, or computing device 201. In this manner, display information for rendering the 2-D landscape may be sent to spectator display 204 by computing device 201 (or a player device) over the network (e.g., via websockets), or by a player device (e.g., second player device 203) via a wireless protocol. Wireless protocols that may be used to communicate with spectator display 205 may include, for example. WiFi, infrared, Bluetooth, NFC, or the like.

The subject technology may further provide a spatial soundscape customized to one or more of the participating player devices. In this regard, computing system 201 may include a sound module 206 that operates in connection with previously described game software 202 to generate various sound effects and music tracks for audio playback to the players in connection with game play. Sound module 206 may communicate with, for example, a web browser using the HTML5 web audio API. Sound effects may include, for example, sounds that play when game tokens interact with each other (e.g., cars crash) or interact with portions of the gamespace environment (e.g., a car hits the side of the track or wall). Sound effects way be digitally recorded and stored on computing system 201 as a small sound file, and transmitted to the various devices as needed. Additionally or in the alternative, the sound file may be stored on the player devices, and computing system 201 may signal a device to play the sound file (e.g., via a message) at the appropriate moment (e.g., in response to an interaction).

In some implementations, computing device 201, in connection with sound module 206, generates a soundscape including a sound effect for each game token, and provides each sound effect to a respective device responsible for rendering the game token for audio playback of the sound effect by the device. A sound effect may be provided by download of a sound file, streaming audio from a file stored at computing system 201 or a related storage location, or by signaling the corresponding player device to play the sound effect 301, 302 from a locally stored location on the player device (see FIGS. 3A and 3B). Sound module 206 is configured to determine which of the player devices should receive a sound effect, and at what time, in accordance with current characteristics of game play. For example, a respective sound effect may be panned between the multiple devices with a movement of a corresponding game token (e.g., as a car races around the track).

Sound module 206 may be further configured as a MIDI application configured to play or process MIDI files for generation and playback of a soundscape for the game, including, for example, a plurality of musical instruments. Sound module 206 may be configured to dynamically separate musical components (e.g., instruments) of a MIDI file in connection with changing characteristics of game play. In this regard, sound module 206 may separate a musical composition into a number of tracks that can be sent to each participating player device, so that each device plays an instrument.

Computing device 201, in connection with sound module 206 associates each musical instrument with a respective one of the multiple devices, and provides digital audio for each instrument to a player device associated with that instrument for audio playback of the musical instrument by the player device. In some implementations, computing device 201, in connection with sound module 206, generates a soundscape including, a plurality of musical instruments, associates each game token with a respective musical instrument, and provides, for each musical instrument, digital audio for the musical instrument to a device responsible for rendering a game token corresponding to the musical instrument for audio playback (if the musical instrument by the device.

Figure 3A:
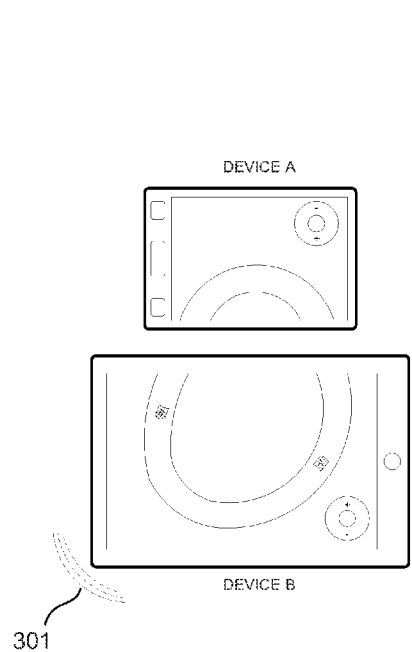
FIGS. 3A and 3B depict example multiple device configurations to illustrate generating an example virtual gamespace based on display characteristics of multiple player devices.

FIGS. 3A and 3D depict example multiple device configurations to illustrate generating an example virtual gamespace based on display characteristics of multiple player devices, according to some aspects of the subject technology. In FIG. 3A, two player devices (labeled "Device A" and "Device B") are participating in an ongoing game. Both devices are positioned face-up on a table so that the display of each device may be collectively viewed as one display. A 2-D landscape for the gamespace of FIG. 3A includes a race track and two cars (one for each player) that move about die track. The 2-D landscape is divided between Device A and Device B so that the display screens of both devices must be viewed at once to complete the virtual landscape associated with the gamespace. Accordingly, the 2-D landscape is viewable when each divided portion of the 2-D landscape is displayed on a respective one of the player devices and the devices are collectively viewed together. As depicted by FIG. 3A, the landscape may be assembled by positioning each device proximate each other according to the portions displayed by the devices.

Figure 3B:
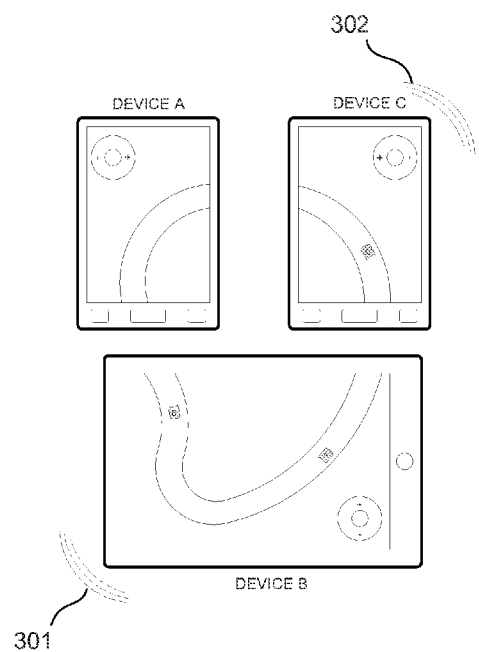

In FIG. 3B, a third device (labeled "Device C") has joined the game. Accordingly, the 2-D landscape for the gamespace, including the displayed race track, has increased in size and features. The length of the track has grown, adding new track to be distributed between the devices. In some implementations, the 2-D landscape (including, e.g., the length of the track) will increase proportional to the new display area (e.g., measured by resolution or physical dimensions or size) available when the new device is added to the game. The 2-D landscape ma be updated based on predetermined template landscapes selected by computing system 201 based on how many player devices are participating in a game. A new template may be downloaded by, or sent to, each player device when the number of player devices changes.

Additionally or in the alternative, features of the 2-D landscape are redistributed across the new configuration of devices and/or altered to provide an enhanced game experience made available by the increased display area. For example, a new race track may be generated that is wider or includes additional turns for the increased display area. In some aspects, one or more portions of the landscape may be updated with random features generated by an algorithm that takes into consideration the number of players and total display area of the devices. The detail of the track may further be adjusted based on physical dimensions of a device. For example, more detail may be rendered on a smaller device with more pixel density than a larger device with less pixel density. Similarly, a larger or more complicated landscape, including more track length and turns, may be rendered on a device with larger physical dimensions and lower pixel density than a device with smaller physical dimensions and a higher pixel density. In this manner, a high-pixel density tablet computer may display much more playable area and in much more detail than a 110 resolution smart phone.

The gamespace, including the size and dimensions of the 2-D landscape, and features of the landscape, are automatically updated as player devices are added or removed from the game. While adding a device may create a larger playable area, removing or turning off a device during the game may create a loss of viewable gamespace. Accordingly, in some implementations, a game may not be started until all playing devices for the game have been identified. When the first player (or "host") device initiates creation of a game, computing system 201 may generate a virtual "lobby" in which the "host" may delay starting the game until all other player devices have connected and have been identified. Once the game is started, new players that were not identified at the start of the game may wait in the lobby until the game is restarted. At this time, the gamespace is updated for the new game based on the addition or removal of player devices. If a player elects to quit the game, game software 202 may delay that player's exit from the game until all player cars have moved off of the exiting player's screen. Track beginning and end points displayed at adjacent player devices may be virtually connected until the game ends or a new template may be loaded.

As described previously, computing system 201 may determine total display area and/or how the participating player devices should be orientated to properly render the total display area based on information obtained from the player devices (e.g., type of device, resolution, screen size, physical dimensions, type of browser, display area of browser, or the like). Computing system 201 may then send a message to each device informing its player where to place the device with respect to the other devices so that the 2-D landscape may be accurately displayed.

In some implementations, player devices may be configured with location-aware hardware and software that enables the devices to automatically determine an ideal orientation for display of the 2-D landscape. For example, a player device may use an internal electric compass to orient the device based on the landscape provided by computing device 201 and the portion of the landscape rendered on the device. The compass may also be used to re-orient the landscape (including, e.g., track 102) when the device is repositioned on a table. In some aspects, GP positioning and/or triangulation may be used for orientation of player devices.

Figure 4:
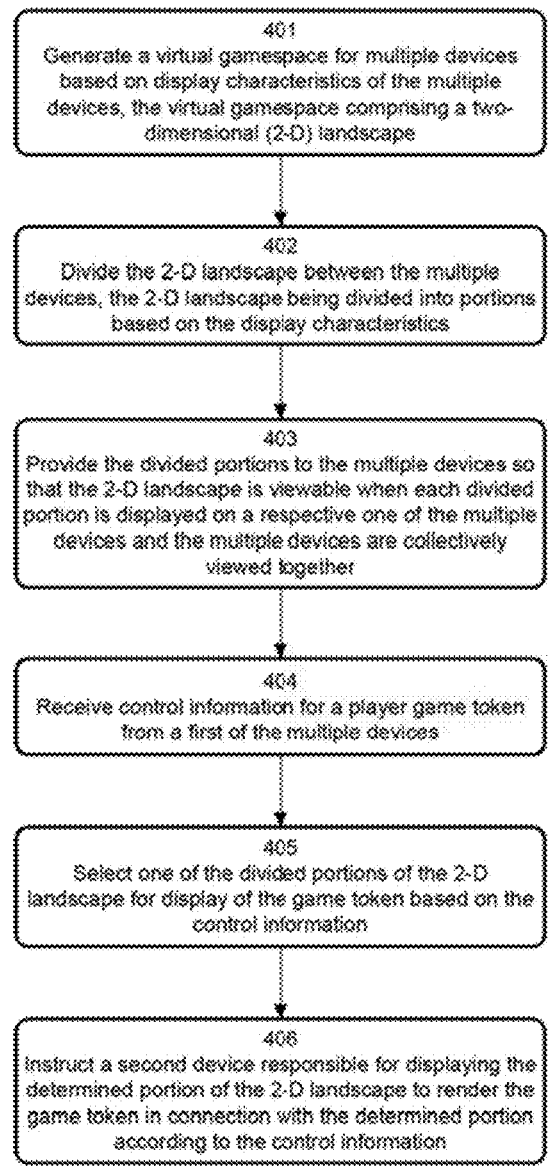
FIG. 4 is a flowchart illustrating an example a process for generating a virtual gamespace based on display characteristics of multiple player devices.

FIG. 4 is as flowchart illustrating an example a process for generating a virtual gamespace based on display characteristics of multiple player devices. According to some aspects, one or more blocks of FIG. 4 may be executed by computing system 201 (including, e.g., software module 101). Similarly, a non-transitory machine-readable medium may include machine-executable instructions thereon that, when executed by a computer or machine, perform the blocks of FIG. 4. Accordingly, the blocks of FIG. 4 may be performed within the context of computer-generated virtual game.

In block 401, at virtual gamespace for multiple devices is generated based on display characteristics of the multiple devices, the virtual gamespace comprising a two-dimensional landscape. As described previously, the 2-D landscape may include a virtual race track. The dimensions of the landscape, and associated race track, ma increase or decrease in size based on how many devices have joined to play the game.

In block 402, the 2-D landscape is divided between the multiple devices, the 2-D landscape being divided into portions (e.g., proportional sections) based on the display characteristics. For example, a portion, or one or more dimensions of the portion, may be sized based on the display area or corresponding dimensions of the device on which it is rendered, relative to other participating player devices. In this regard, the playable area or dimensions of each section may be to ratio or percentage of a total playable area determined by all participating devices.

In block 403, the divided portions are provided to the multiple devices so that the 2-D landscape is viewable when each divided portion is displayed on a respective one of the multiple devices and the multiple devices are collectively viewed together. In some implementations, the divided portions are provided, to respective web browsers operating on the multiple devices. Accordingly, the 2-D landscape is viewable when each respective we browser displays a corresponding divided portion of the 2-D landscape in a browser display area. In these implementations, the playable area for a device may be based on display characteristics of the web browser, including a display resolution or one or more physical dimensions of the browser display area of each respective web browser.

In block 404, control information for a player game token is received from a first of the multiple devices, and in block 405, one of the divided portions of the 2-D landscape for display of the game token is selected based on the control information. Computing system 201 keeps track of the coordinate boundaries of each divided portion of the landscape. When control information is received from a device, a new location is determined and, if the new coordinate location of the game token is determined to be beyond a current boundary, the divided portion within which the game token's new coordinate location is selected.

In block 406, a second device responsible for displaying the determined portion of the 2-D landscape is instructed (e.g., by computing system 201) to render the game token in connection with the determined portion according to the control information. For example, the control information, or a representation of the control information may be sent (e.g., transmitted) to the second device for rendering of the game token by the second device in connection with the determined portion according to the control information. In this manner, as a player moves his or her game token over the 2-D landscape, the player observes the game token move between each device, the entire motion being viewed using the displays of all participating devices.

While the subject technology has been described with respect to a virtual automobile racing game, computing system 201 and the various player devices ma be similarly configured to operate and provide gameplay for other types of virtual games. For example, the virtual gamespace may include a landscape that depicts a section of outer space. In this regard, game tokens may be spaceships or other types of vehicles that move from one section of outer space displayed on one device to another section displayed on another device. Likewise, obstacles (e.g., space debris, asteroids, or other planetary objects) may move from display to display and interact with player tokens. In some implementations, the virtual gamespace may be a 3-D gamespace with a 3-D landscape.

Figure 5:
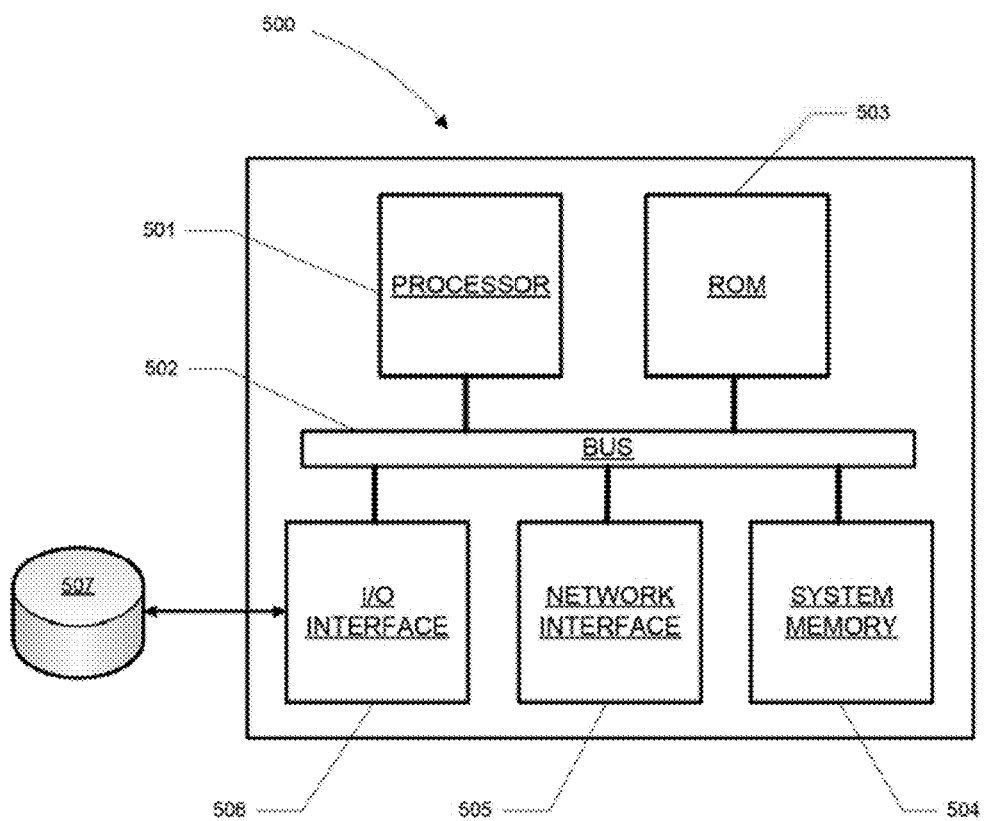
FIG. 5 is a diagram illustrating an example computing device for generating a virtual gamespace based on display characteristics of multiple player devices, including a processor and other internal components.

FIG. 5 is a diagram illustrating an example computing device for generating a virtual gamespace based on display characteristics of multiple player devices, including a processor and other internal components, according to one aspect of the subject technology. In some aspects, a computerized device 500 (for example, computing system 201 computing device 202 or 203, or the like) includes several internal components such as a processor 501, a system bus 502, read-only memory 503, system memory 504, network interface 505, I/O interface 506, and the like. In one aspect, processor 501 may also be communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from ROM 503, system memory 504, or received from a storage medium 507 (for example, via I/O interface 506). ROM 503, system memory 504, and storage medium 507 represent examples of machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 and/or storage medium 507 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 504 represents volatile memory used to temporarily store data and information used to manage device 500. According to one aspect of the subject technology, system memory 504 is random access memory (RAM) such as double data rate (DDR) RAM. Other types of RAM also may be used to implement system memory 504. Memory 504 may be implemented using a single RAM module or multiple RAM modules. While system memory 504 is depicted as being part of device 500, it should be recognized that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a player or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of as method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for distributing a gamespace between multiple devices, comprising:
    generating a virtual gamespace for multiple devices based on display characteristics of the multiple devices, the virtual gamespace comprising a two-dimensional (2-D) landscape;
    dividing the 2-D landscape between the multiple devices, the 2-D landscape being divided into portions based on the display characteristics;
    providing the divided portions to the multiple devices so that the 2-D landscape is viewable when each divided portion is displayed on a respective one of the multiple devices and the multiple devices are collectively viewed together;
    receiving control information for a player game token from a first of the multiple devices; and
    providing the control information to move a location of the game token from a first of the divided portions of the 2-D landscape onto a second of the divided portions of the 2-D landscape, the control information continually moving the location of the game token over the second of the divided portions of the 2-D landscape, wherein the control information is received at the first device and provided from the first device to a second of the multiple devices while the game token is displayed on the second of the divided portions by the second device.

2. The computer-implemented method of claim 1, wherein providing the divided portions to the multiple devices comprises:
    providing the divided portions to respective web browsers operating on the multiple devices, wherein the 2-D landscape is viewable when each respective web browser displays a corresponding divided portion of the 2-D landscape in a browser display area.

3. The computer-implemented method of claim 2, wherein the display characteristics comprise a display resolution or one or more physical dimensions of the browser display area of each respective web browser.

4. The computer-implemented method of claim 1, wherein the display characteristics comprise a display resolution of each of the multiple devices.

5. The computer-implemented method of claim 1, wherein the display characteristics comprise a screen size of each of the multiple devices.

6. The computer-implemented method of claim 1, wherein the virtual gamespace is reduced when a device is removed from the multiple devices, and increased when a device is added to the multiple devices.

7. The computer-implemented method of claim 1, comprising:
    generating a soundscape comprising a plurality of musical instruments;
    associating each musical instrument with a respective one of the multiple devices; and
    providing, for each musical instrument, digital audio for the musical instrument to a device associated with the musical instrument for audio playback of the musical instrument by the device.

8. The computer-implemented method of claim 1, comprising:
    generating a soundscape comprising a plurality of musical instruments;
    associating each game token with a respective musical instrument; and
    providing, for each musical instrument; digital audio for the musical instrument to a device responsible for rendering a game token corresponding to the musical instrument for audio playback of the musical instrument by the device.

9. The computer-implemented method of claim 1, comprising:
    generating a soundscape comprising a sound effect for each game token; and
    providing each sound effect to a respective device responsible for rendering the game token for audio playback of the sound effect by the device.

10. The computer-implemented method of claim 8, wherein a respective sound effect is panned between the multiple devices with a movement of a corresponding game token.

11. The computer-implemented method of claim 1, wherein the 2-D landscape comprises a virtual race track and the game token is a virtual car.

12. A non-transitory machine-readable medium having machine-executable instructions stored thereon, which when executed by a machine or computer cause the machine or computer to perform a method, comprising:
    generating a virtual gamespace for multiple devices based on display characteristics of the multiple devices, the virtual gamespace comprising a two-dimensional (2-D) landscape;
    dividing the 2-D landscape between the multiple devices, the 2-D landscape being divided into portions each having one or more dimensions based on the display characteristics;
    providing the divided portions to the multiple devices so that the 2-D landscape is viewable when each divided portion is displayed on a respective one of the multiple devices and the multiple devices are collectively viewed together; and
    receiving control information for a player game token from a first of the multiple devices;
    providing the control information to move a location of the game token from a first of the divided portions of the 2-D landscape onto a second of the divided portions of the 2-D landscape, the control information continually moving the location of the game token over the second of the divided portions of the 2-D landscape, wherein the control information is received at the first device and provided from the first device to a second of the multiple devices while the game token is displayed on the second of the divided portions by the second device.

13. The non-transitory machine-readable medium of claim 12, wherein providing the divided portions to the multiple devices comprises:
    providing the divided portions to respective web browsers operating on the multiple devices, wherein the 2-D landscape is viewable when each respective web browser displays a corresponding divided portion of the 2-D landscape in a browser display area.

14. The non-transitory machine-readable medium of claim 13, wherein the display characteristics comprise a display resolution or one or more physical dimensions of the browser display area of each respective web browser.

15. The non-transitory machine-readable medium of claim 12, wherein the display characteristics comprise a display resolution or a physical screen size of each of the multiple devices.

16. The non-transitory machine-readable medium of claim 12, wherein the virtual gamespace is reduced when a device is removed from the multiple devices, and increased when a device is added to the multiple devices.

17. The non-transitory machine-readable medium of claim 12, the method further comprising:

generating a soundscape comprising a plurality of musical instruments;

associating each musical instrument with a respective one of the multiple devices; and providing, for each musical instrument, digital audio for the musical instrument to a device associated with the musical instrument for audio playback of the musical instrument by the device.

18. The non-transitory machine-readable medium of claim 12, the method further comprising:

generating a soundscape comprising a plurality of musical instruments;

associating each game token with a respective musical instrument; and providing, for each musical instrument, digital audio for the musical instrument to a device responsible for rendering a game token corresponding to the musical instrument for audio playback of the musical instrument by the device.

19. The non-transitory machine-readable medium of claim 12, the method further comprising:

generating a soundscape comprising a sound effect for each game token; and providing each sound effect to a respective device responsible for rendering the game token for audio playback of the sound effect by the device, wherein a respective sound effect is panned between the multiple devices with a movement of a corresponding game token.

20. A system, comprising:

a processor; and a memory including instructions that, when executed by the processor, causes the processor to:

receive one or more requests from multiple computing devices to participate in a virtual game;

generate a virtual gamespace for the multiple computing devices based on display characteristics of web browsers for the multiple computing devices, the virtual gamespace comprising a two-dimensional (2-D) landscape;

divide the 2-D landscape between display areas for the web browsers, the 2-D landscape being divided into portions each being sized based on the display characteristics;

provide the divided portions to the web browsers so that the 2-D landscape is viewable when each divided portion is displayed on a respective one of the multiple computing devices and the display areas for the web browsers are collectively viewed together;

receive control information for a player game token from a first of the multiple computing devices; and provide the control information to move a location of the game token from a first of the divided portions of the 2-D landscape onto a second of the divided portions of the 2-D landscape, the control information continually moving the location of the game token over the second of the divided portions of the 2-D landscape, wherein the control information is received at the first device and provided from the first device to a second of the multiple devices while the game token is displayed on the second of the divided portions by the second device.

* * * * *